United States Patent
Bej et al.

(10) Patent No.: US 9,262,702 B1
(45) Date of Patent: Feb. 16, 2016

(54) METHOD AND SYSTEM FOR FORCED UNIDIRECTIONAL TRAPPING ("FUT") FOR CONSTANT SWEEP COLOR OBJECT-BACKGROUND COMBINATION

(71) Applicant: XEROX CORPORATION, Norwalk, CT (US)

(72) Inventors: Ranita Bej, West Bengal (IN); Apurba Das, West Bengal (IN)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/687,359

(22) Filed: Apr. 15, 2015

(51) Int. Cl.
*H04N 1/60* (2006.01)
*G06K 15/02* (2006.01)
*G06K 1/00* (2006.01)

(52) U.S. Cl.
CPC .... *G06K 15/1826* (2013.01); *G06K 2215/0094* (2013.01)

(58) Field of Classification Search
None
See application file for complete search history.

(56) References Cited

U.S. PATENT DOCUMENTS

| | | | |
|---|---|---|---|
| 2003/0179394 A1* | 9/2003 | Lane | H04N 1/58 358/1.9 |
| 2005/0012946 A1* | 1/2005 | Wilson | G06K 15/02 358/1.9 |

* cited by examiner

*Primary Examiner* — Quang N Vo
(74) *Attorney, Agent, or Firm* — MH2 Technology Law Group LLP

(57) ABSTRACT

The present disclosure relates to a computer-implemented method, device, and computer-readable storage medium used for trapping an object against a gradient background comprising: obtaining a trapping parameter for the object in both a fast scan and slow scan direction; forming a first, a second, and a third color trap for the object; comparing the first color trap for the object with the second color trap for the object; comparing the first color trap for the object with the third color trap for the object; determining that a result of the comparing the first color trap for the object with the second color trap for the object yields a larger result than a result of the comparing the first color trap for the object with the third color trap for the object; and applying trapping to the inner side of the object.

18 Claims, 11 Drawing Sheets

CLASSICAL TRAPPING

PROPOSED FUT
(ACCORDING TO FACT)

PROPOSED FUT
(ACCORDING TO FCCT)

METHOD AND SYSTEM FOR FORCED UNIDIRECTIONAL TRAPPING ("FUT") FOR CONSTANT SWEEP COLOR OBJECT-BACKGROUND COMBINATION

FIELD

One or more of the presently disclosed examples is related to trapping techniques to prevent visual gaps or overlaps between colors in printed/copied images.

BACKGROUND

In order to print a color image, a copier or printer separates the image into primary ink colors, such as cyan, magenta, yellow, and black (CMYK). The copier or printer then prints layers of the primary inks separately one on top of the other to reproduce the full variety of colors in the image. This process is known as process color separation.

During process color separation, the printer or copier must accurately register the boundaries between adjacent colored areas. Unfortunately, accurate registration of color separation boundaries is difficult. Mis-registration of boundaries between colors often results in undesirable defects, such as gaps or overlaps, in the printed image.

In addition to color mis-registration, other types of errors can also occur during color printing. For example, "halo" effect errors can appear in a printed image as a side-effect of the xerographic marking process. As the term implies, "halo" effect is where a halo (or gap) appears at the interface between two colored regions. Mis-registration and halo are examples of a general class of errors described as "adjacency errors" which affect the boundary regions of adjacent colors.

For example, FIG. 1 illustrates an image 100 and examples of how a copier or printer may reproduce it. As shown, image 100 includes a first colored square area 104 that is surrounded by a second colored area 102. Image 106 is one example resulting from an error in the colored areas in image 100. This error may be due to color mis-registration, halo effect error, or a combination of both. As shown, image 106 may include a halo effect error, which can be seen as a space or gap 108. As another example, image 110 includes a gap 112 and a dark overlap area 114 that has been caused by a color mis-registration error of colored area 104 relative to colored area 102.

Trapping is one technique that may be used to compensate for color mis-registration. In general, trapping parameters are designed to overcompensate for an error because gaps between colored areas are considered highly undesirable. Thus, in conventional trapping, the colored areas 102 and 104 are intentionally grown or expanded into each other to fill in any gaps, such as gaps 108 or 112. For example, image 116 illustrates how trapping may be used to compensate for color mis-registration error shown in image 110.

Unfortunately, conventional trapping causes its own side effects, such as dark colored area 118, to appear in image 116. These dark colored areas are also undesirable. However, as long as these dark colored areas can be minimized, they are considered preferable over gaps (e.g., areas 108 or 112) at least in the case of these darker colors.

Conventionally, trapping parameters are determined for use across a group or fleet of copiers or printers. Typical trapping parameters may account for variations that can exist across a fleet of printers or copiers. That is, a conventional trapping parameter will specify growth of a colored area in both directions along an axis, such as both left and right (or +/−x) and both up and down (or +/−y). This allows a trapping parameter to correct for errors in virtually any situation and direction. However, this conventional approach to trapping tends to overcompensate for errors and fails to minimize the side effects of trapping, such as dark areas 114 and 118.

SUMMARY

In implementations, a computer-implemented method for trapping an object against a gradient background is disclosed. The method can comprise obtaining a trapping parameter for the object in both a fast scan and slow scan direction; forming a first, a second, and a third color trap for the object, wherein the first color trap comprises both a trap parameter on both an inner side and an outer side of the object for different portions of the object, the second color trap comprises a trap parameter on an inner side of the object, and the third color trap comprises a trap parameter on an outer side of the object; comparing the first color trap for the object with the second color trap for the object; comparing the first color trap for the object with the third color trap for the object; determining that a result of the comparing the first color trap for the object with the second color trap for the object yields a larger result than a result of the comparing the first color trap for the object with the third color trap for the object; and applying trapping to the inner side of the object.

In some aspects, the method can comprise determining that a result of the comparing the first color trap for the object with the second color trap for the object yields a smaller result than a result of the comparing the first color trap for the object with the third color trap for the object; and applying trapping to the outer side of the object.

In some aspects, the comparing the first color trap for the object with the second color trap for the object and the comparing the first color trap for the object with the third color trap for the object is performed using an exclusive or operation.

In some aspects, the method can further comprise determining a color used for the trapping based on the comparing the first color trap for the object with the second color trap for the object or the comparing the first color trap for the object with the third color trap for the object is performed using an exclusive or operation.

In some aspects, the method can further comprise applying a Forced Constant Color Trapping ("FCCT") based on based on the comparing the first color trap for the object with the second color trap for the object or the comparing the first color trap for the object with the third color trap for the object is performed using an exclusive or operation.

In some aspects, the method can further comprise applying a Forced Average Color Trapping ("FACT") based on based on the comparing the first color trap for the object with the second color trap for the object or the comparing the first color trap for the object with the third color trap for the object is performed using an exclusive or operation.

In some aspects, a device is disclosed that can comprise a memory containing instructions; and at least one processor, operably connected to the memory, the executes the instructions to perform a method for trapping an object against a gradient background, the method comprising: obtaining a trapping parameter for the object in both a fast scan and slow scan direction; forming a first, a second, and a third color trap for the object, wherein the first color trap comprises both a trap parameter on both an inner side and an outer side of the object for different portions of the object, the second color trap comprises a trap parameter on an inner side of the object, and the third color trap comprises a trap parameter on an outer side of the object; comparing the first color trap for the object with the second color trap for the object; comparing the first color trap for the object with the third color trap for the object; determining that a result of the comparing the first color trap for the object with the second color trap for the object yields a larger result than a result of the comparing the first color trap for the object with the third color trap for the object; and applying trapping to the inner side of the object.

In some aspects, a computer readable storage medium is disclosed that can comprise instructions for causing one or more processors to perform a method, the method for trapping an object against a gradient background comprising obtaining a trapping parameter for the object in both a fast scan and slow scan direction; forming a first, a second, and a third color trap for the object, wherein the first color trap comprises both a trap parameter on both an inner side and an outer side of the object for different portions of the object, the second color trap comprises a trap parameter on an inner side of the object, and the third color trap comprises a trap parameter on an outer side of the object; comparing the first color trap for the object with the second color trap for the object; comparing the first color trap for the object with the third color trap for the object; determining that a result of the comparing the first color trap for the object with the second color trap for the object yields a larger result than a result of the comparing the first color trap for the object with the third color trap for the object; and applying trapping to the inner side of the object.

The present disclosure also provides a computer-readable medium which stores programmable instructions configured for being executed by at least one processor for performing the methods described herein according to the present disclosure. The computer-readable medium can include flash memory, CD-ROM, a hard drive, etc.

BRIEF DESCRIPTION OF THE DRAWINGS

Various embodiments of the present disclosure will be described herein below with reference to the figures wherein:

FIG. 6C shows trapping using FUT with FCCT;

DETAILED DESCRIPTION

Figure 1:
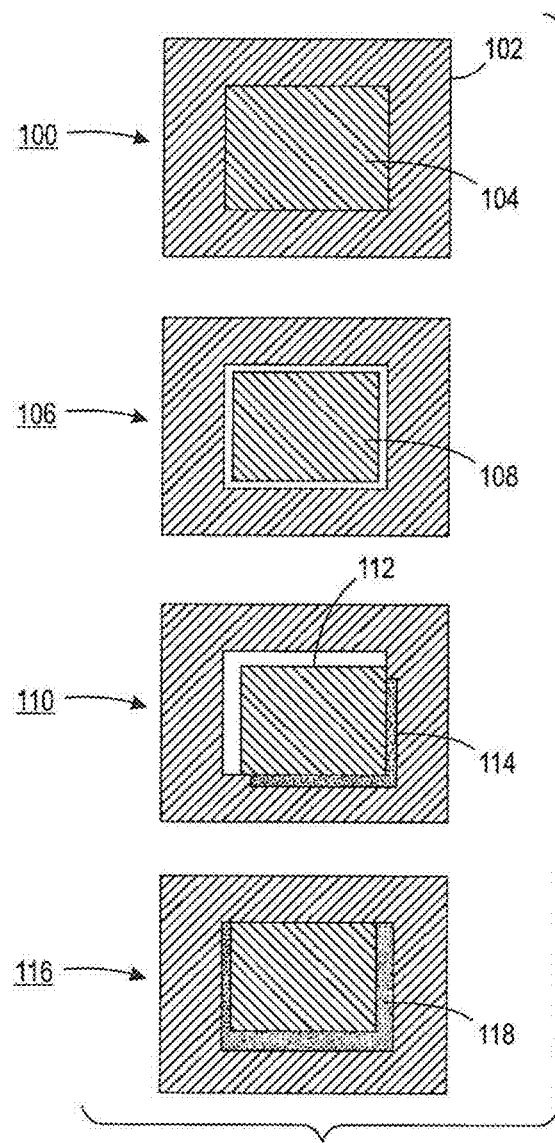
FIG. 1 illustrates an image and examples of how that image may be reproduced with trapping.

In the printing systems where the quality of printing is minutely examined, different types of object optimized rendering (OOR) filters (for example, trapping filters, anti-aliasing filters, etc.) may be employed to improve the image quality (IQ) of objects, for example, graphics, text, image object, jagging effect of curvy text, graphics, etc. In conventional printing systems, the trapping filter generates a perceptually dominant third ($3^{rd}$) color of a specific user-defined trap-distance from the packed color-pair of object and background. The conventional implementation of trapping an object and background color is encountered in terms of Lab color space or equivalent neutral density ("END"), respectively. As is known in the art, Lab color space is designed to approximate human vision and is a color-opponent space with dimension L for lightness and a and b for the color-opponent dimensions, based on nonlinearly compressed coordinates. Also, as known in the art, neutral density is a measure of how dark an ink is, where each ink has its own neutral density parameter. The trapping can determine which color to spread based on the relative neutral density of two adjacent colors.

Generally, the lighter color spreads over the darker color region along the trap geometry. Because of this tendency of color spreads, multiple image quality ("IQ") distortions in constant color objects placed over a color gradient or sweep background have been observed. The lighter background with respect to object will result in choke, whereas darker background (other portion of the sweep background) with respect to the constant color object will result in spread in trapping. As a consequence the trapped object tends to be distorted. This is one IQ issue that has yet to be adequately addressed.

As indicated above, the classical algorithm of trapping uses a concept of spreading the color from a lighter to a darker region. But for sweep background and constant color object combination between object and background, this algorithm creates imaging artifact (i.e. IQ defect) that results in spreading the color inside in some places and outside in other places. To overcome this problem, a method is provided herein of trapping in instances where the background of a constant color object is swipe or multi-gradient color. Generally, the presently disclosed method determines the necessity of forced unidirectional trapping ("FUT") and next performs the FUT. In FUT, the direction of the trap color is forced to be unidirectional (either outside the object or inside the object) and the weight of the colors is determined with respect to the ratio of number of scan lines that are used to determine between applying a choke or a spread technique for the trapping. Accordingly, the new color and only one direction of trapping would be chosen and FUT would be applied. This could be triggered by a user or could be automatically determined based on the interactions between the object and background.

Figure 2A:
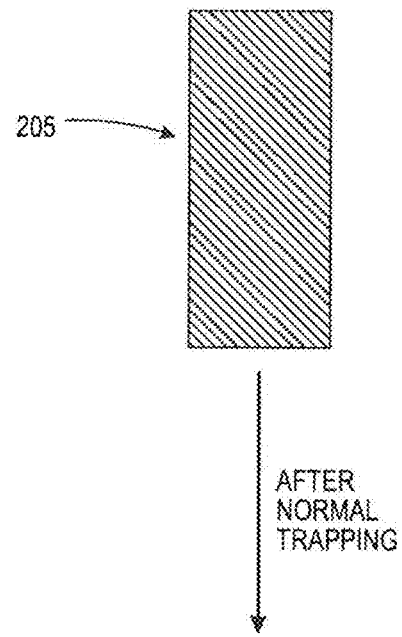
FIGS. 2A and 2B show an example object depicted as a block letter "I" 205 and the distorted object 205 after conventional trapping, respectively.
Figure 2B:
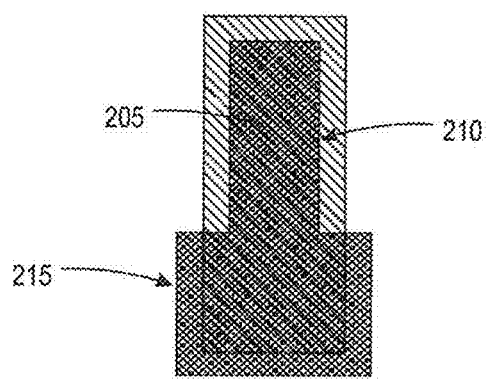

As discussed above, the conventional implementation of trapping is to calculate the third color between the object and the background color to fill the mis-registered places. Generally, the lighter color spreads over the darker color region along the trap geometry. So if the background of an object has both darker and lighter area than the object itself, then the trap color will be spread inside and outside the object, local region wise. This will result in a distorted realization of the trapped object. FIGS. 2A and 2B show an example object depicted as a block letter "I" 205 and the distorted object 205 after conventional trapping, respectively, where 210 is "choke" and 215 is "spread." In particular, FIG. 2B shows the trapped object "I" 205 without depicting the background; however, the result of the irregular direction trap (choke and spread in the same object) considering a sweep color in the background, where the upper half of the background (not shown) is lighter than the object color and the lower half of the background (not shown) is darker than the object color. Due to the color rules where color flows from a lighter side to a darker side, the traditional trapping, as shown in FIG. 2B, the upper portion of the object "I" gets choked and the lower portion of the object "I" gets spread. As a consequence, a distorted image "I" is produced.

Figure 3:
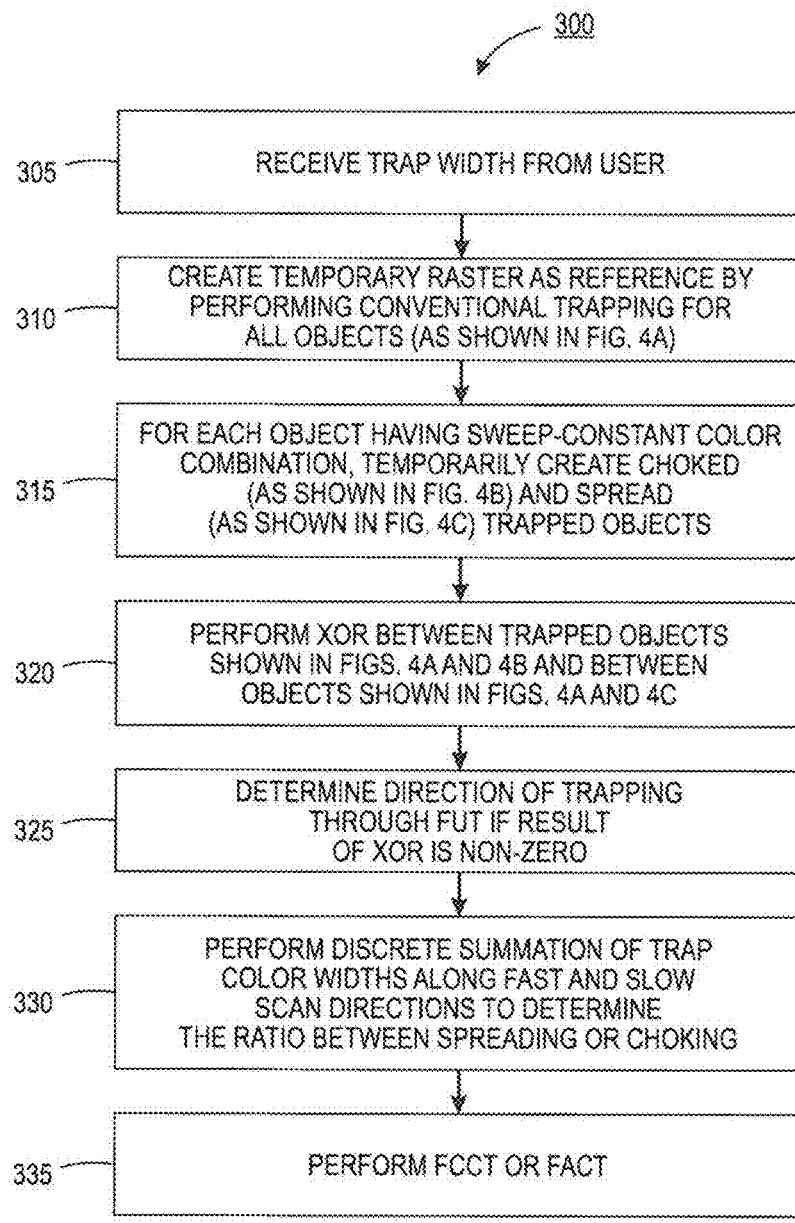
FIG. 3 illustrates a example method for trapping, according to aspects consistent with the present teachings.
Figure 4A:
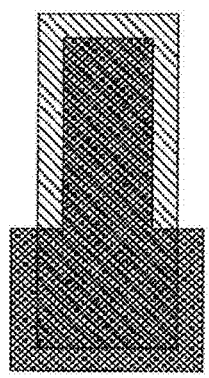
FIGS. 4A-4C shows an example of a normally trapped object when the background is sweep with background of the top portion of the object 'I' is lighter than the color of 'I and background of the bottom portion of the object 'I' is darker with respect to object color 'I', the trapped object with trap width applied on outer side (spread) of the object, and the trapped object with trap width applied on inner side (choke) of the object, respectively.
Figure 4B:
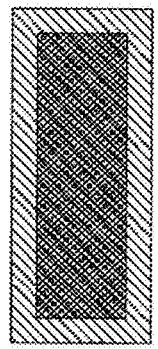
Figure 4C:
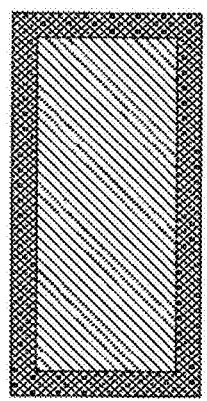
Figure 5:
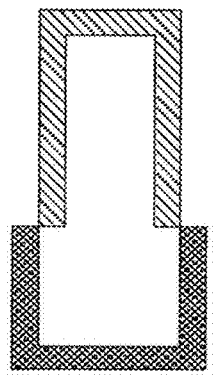
FIG. 5 shows an example comparison between FIGS. 4A and 4B.

FIG. 3 shows an example method 300 that provides an option to a user to choose higher quality trapping with little to no distortions, according to aspects of the present disclosure. At 305, the user defined for trap width in terms of pixels both in fast and slow scan directions is obtained. As is known in the art, printers typically transport a receiver past a photoreceptor to form the print image. The direction of travel of the receiver is referred to as the slow-scan, process, or in-track direction. This is typically the vertical (Y) direction of a portrait-oriented receiver. The direction perpendicular to the slow-scan direction is referred to as the fast-scan, cross-process, or cross-track direction, and is typically the horizontal (X) direction of a portrait-oriented receiver. "Scan" does not imply that any components are moving or scanning across the receiver; the terminology is conventional in the art. At 310, conventional trapping is performed by creating a temporary raster graphics image for one or more of the objects to be trapped, such as that shown in FIG. 4A, which is a normally trapped object (which is the same object shown in FIG. 2B). At 315, for each object having a sweep (background)-constant color (object) combination, temporarily create two virtually trapped objects, one with a lighter and constant color background around the object and with trap width applying on outer side (spread) of the object, as shown in FIG. 4B, and the other with a darker and constant color background around the object and with trap width applying on inner side (choke) of the object, as shown in FIG. 4C. At 320, the normally trapped object of FIG. 4A is compared individually using an exclusive or operation (XOR) with the trapped object with spread of FIG. 4B and with the trapped object with choke of FIG. 4C. At 325, if the result of the XOR logic operation is non-zero, as shown in FIG. 5, for any portion of the region in both the cases, then FUT is applied. Otherwise (commonality with either of these patterns, FIG. 4B or 4C), the conventional trapping approach could be applied.

At 330, a discrete summation (integration) of the trap color widths (in terms of pixel numbers) along the fast and slow scan directions is performed to determine the ratio between spreading or choking. For example, a summation of the number of slow scan pixels of cluster belonging to spread (say 'x') and cluster belonging to choke (say 'y') is performed. If x is greater than y, then the outer trapping (spreading) is applied for the complete object. If x is smaller than y, then inner trapping (choke) is applied for the complete object.

During the FUT processing, the determination of a trap color to be placed may also need to be decided by the algorithm. If the user is interested in using a constant color, the color of a larger cluster (e.g., if spread area is larger than choke area, then the spread color is the color of larger cluster) is used to trap. In this case, there is no additional color calculation that is required to improve the speed of the processing. At 335, since the colors will likely not be same for spread and choke, the user can choose to perform forced constant color trapping ("FCCT"), which uses the color of the larger cluster, or forced average color trapping ("FACT"), which uses the weighted (by the ratio of scan lines "in" to "out" direction) average of the cluster colors as the trap color.

Figure 6A:
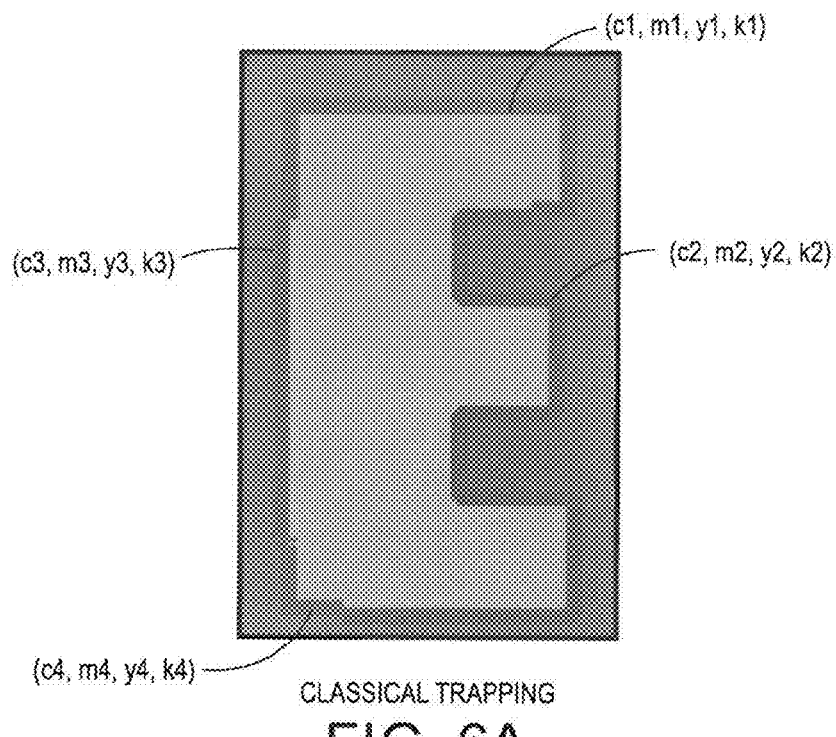
FIGS. 6A-6C show example trapping, where FIG. 6A show classical trapping, FIG. 6B show trapping using FUT with FACT.
Figure 6B:
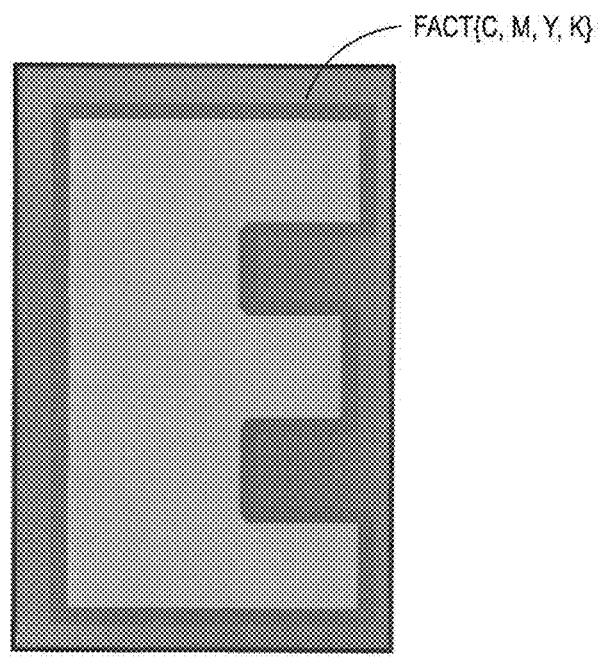
Figure 6C:
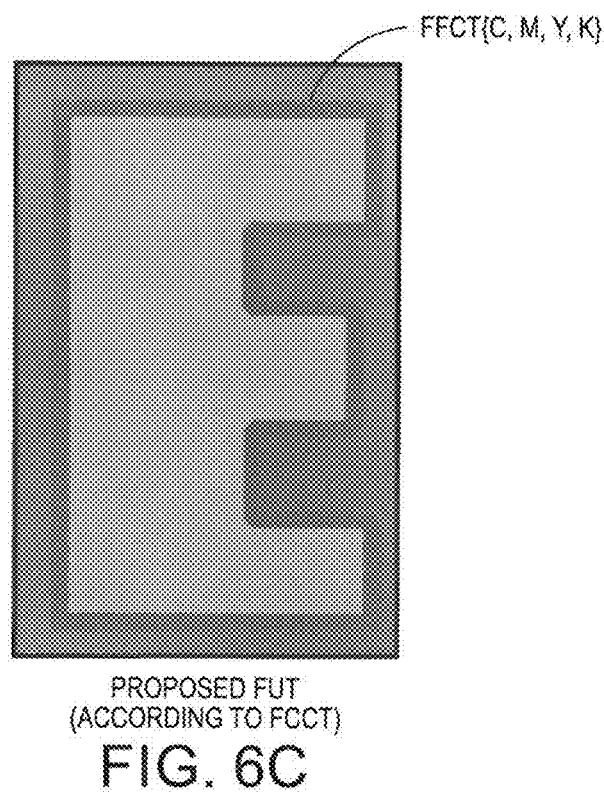

FIGS. 6A-6C show example trapping, where FIG. 6A show classical trapping, FIG. 6B show trapping using FUT with FACT, and FIG. 6C shows trapping using FUT with FCCT. In FIG. 6A, the letter "E" is shown with four regions or clusters of pixels where trapping is performed. The clusters of pixels have pixel values for the trapped area, which are cyan ("c"), magenta ("m"), yellow ("y"), and black ("k"), where the first cluster is represented by the set (c1, m1, y1, k1), the second cluster by set (c2, m2, y2, k2), the third cluster by set (c3, m3, y3, k3), and the fourth cluster by set (c4, m4, y4, k4). In FIG. 6B, the trapping using FUT with FACT is determined based on: C=avg {c1, c2, c3, c4, . . . }, M=avg{m1, m2, m3, m4, . . . }, Y=avg{y1, y2, y3, y4, . . . }, K=avg{k1, k2, k3, k4, . . . }. In FIG. 6C, the trapping using FUT with FCCT is determined based on: C=max {c1, c2, c3, c4, . . . }, M=max{m1, m2, m3, m4, . . . }, Y=max{y1, y2, y3, y4, . . . }, K=max{k1, k2, k3, k4, . . . }. Here, avg=average function to compute the average value, max=maximum function to compute the max value. C, M, Y, K are the final color values respectively for cyan, magenta, yellow, and black.

The representations shown in FIGS. 6A-6C are merely simplistic examples, since there are many pixels in a typical trapped area. Although the clusters of FIGS. 6A-6C show four values among them, the c, m, y, k can have n number of pixel values. Also, not shown are the values of C, M, Y, K separately. The final color is a combination of C, M, Y, K. The calculation of the maximum or average value is performed with all the four separate planes.

Figure 7:
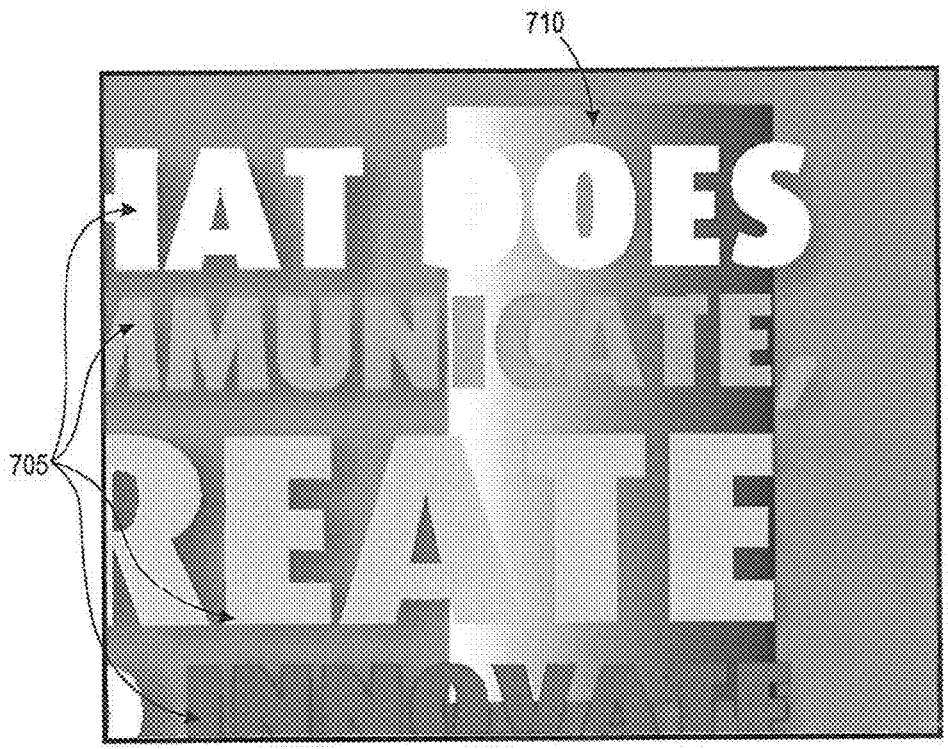
FIGS. 7-10 show example images using the conventional trapping method and the present trapping method.
Figure 8:
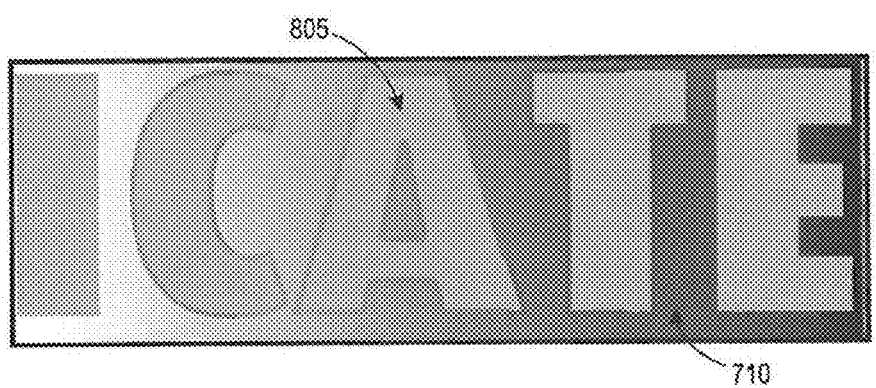
Figure 9:
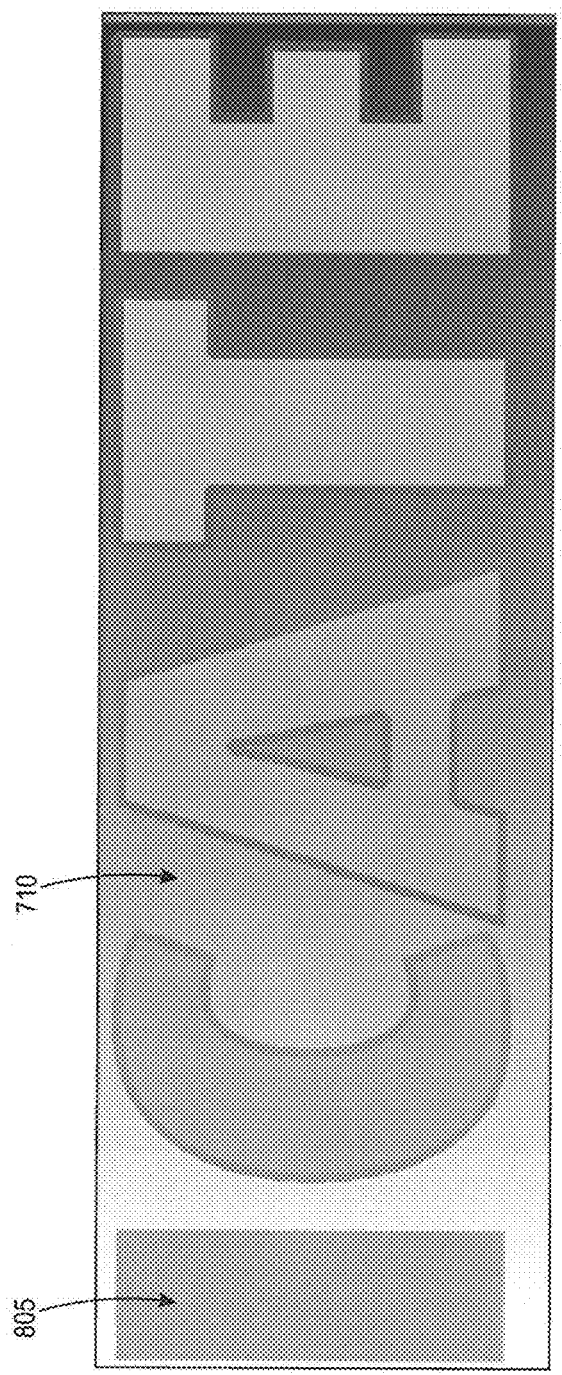
Figure 10:
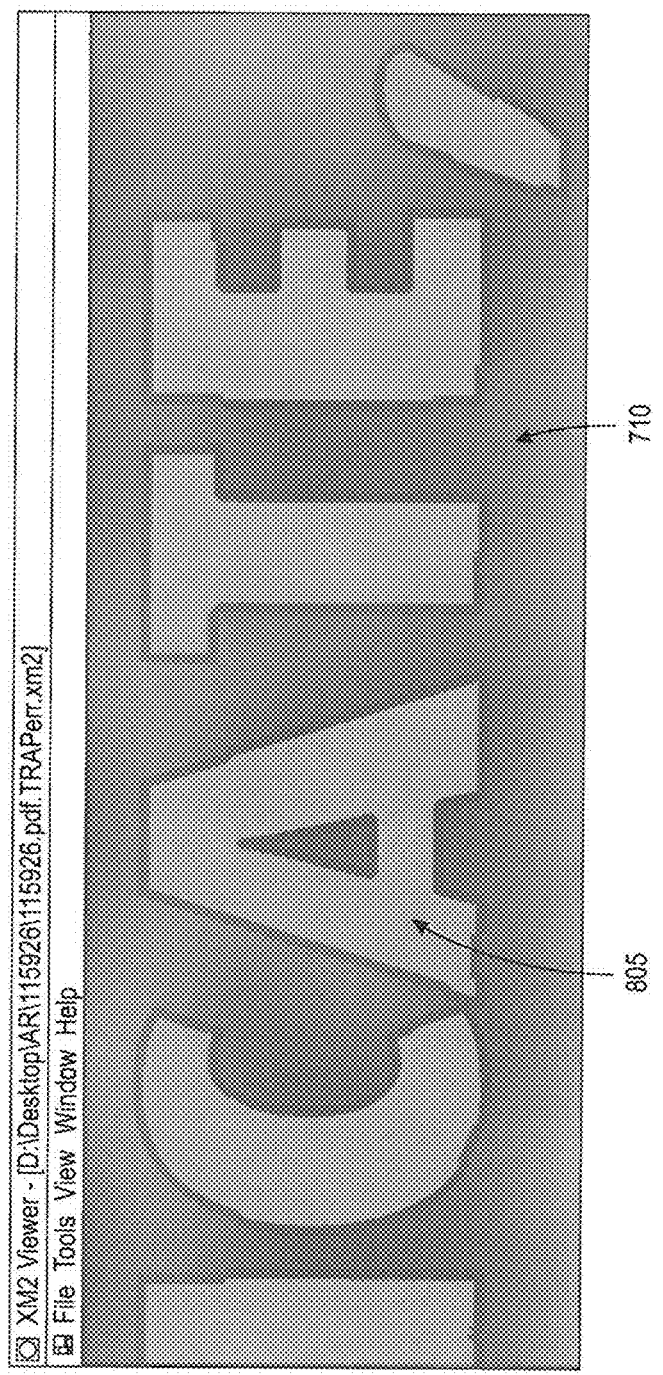

FIGS. 7-10 show example images using the conventional trapping method and the present trapping method. In particular, FIG. 7 shows an example image with text objects 705 printed across a background 710 having a gradient or sweep color feature. FIG. 8 shows a close up of a portion of FIG. 7 showing the object phrase "ICATE" 805 against the background 710. FIG. 9 shows the object phrase "ICATE" 805 against the background 610 after having trapping applied in accordance with the present teachings. FIG. 10 shows another example of the object 805 against the background 610 using the convention trapping approach. As can be seen in FIG. 10, the convention approach yields unsatisfactory results where both spread and choke are applied to the same object, whereas the trapping of FIG. 9 yields more uniform and consistent appearance.

Figure 11:
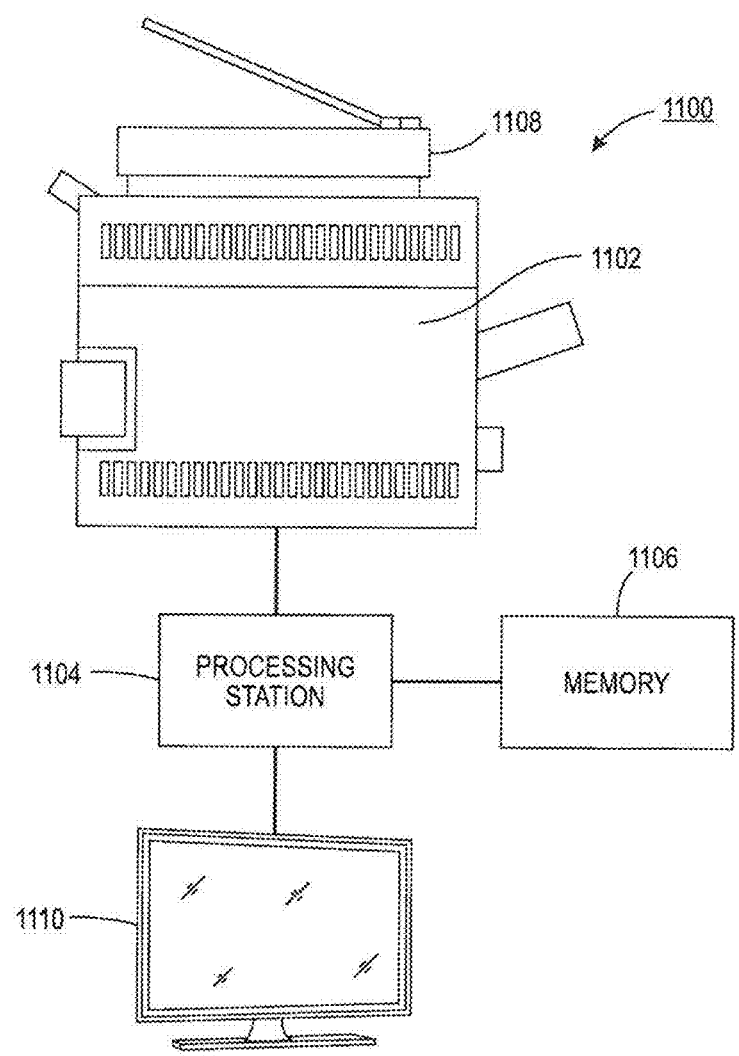
FIG. 11 illustrates an example printing system 1100 that is consistent with some examples of the present disclosure.

FIG. 11 illustrates an example printing system 1100 that is consistent with some examples of the present disclosure. For example, system 1100 can be implemented as a xerographic printing or copying device. Accordingly, system 1100 can print or copy a reproduction of an image in two or more colors. It may be appreciated that any type of printing or imaging device can be implemented in system 1100.

System 1100 may encode images based on either analog or digital representations of the image. For example, system 1100 may encode images based on determining picture elements (i.e., "pixels") in each image. System 1100 may determine pixels of an image by gathering data generated from a photo sensor cell when scanning a physical image. In some examples, system 1100 obtains pixels of an image through line by line scanning of the image by one or more photosensitive elements, such as a multiple photo sensor array of charge couple devices (CCDs). System 1100 can also receive or derive data and pixels of an image from a computer (not shown) that is executing a document creation application, such as Microsoft Word™, from a data storage device (not shown), or other applications. System 1100 may be coupled to these devices, for example, via a network or some other communications channel.

System 1100 may then reproduce the image onto a hardcopy medium by rendering the pixels of the image based on a variety of technologies, such as a laser, toner, or ink droplet. In some examples, system 1100 may reproduce a color image based on a color separation process. For example, system 1100 can use the well known CYMK color separation process. System 1100 may also use other rendering techniques to reproduce or print an image, such as spot color separation.

The components of some examples of system 1100 will now be described. As shown, system 1100 may include a printing section 1102, a processing station 1104, a memory 1106, a raster input section (RIS) 1108, and a user interface 1110.

Printing section 1102 includes components of hardware and software that are used to print an image onto a hardcopy medium, such as paper, film, etc. For example, printing section 1102 can be implemented as a digital color printer, a digital copier, digital press, an ink-jet printer, a xerographic printer, or other type of known printing or imaging device. As noted above, printing section 1102 may use the well known CYMK color separation process in order to print color images. However, any type of printing process may be used by printing section 1102.

Printing section 1102 is implemented using well known components of hardware and software. In some examples, printing section 1102 may suffer from color registration errors or halo effect errors when reproducing an image onto a hardcopy medium. For example, printing section 1102 may have a color registration error that results in a gap or overlap between two regions of color in an image. As another example, printing section 1102 may also suffer from halo effect errors. However, in various examples, printing section 1102 or processing station 1104 may compensate for these errors, either individually or collectively, based on trapping parameters that are determined in accordance with the principles of the present disclosure as discussed herein.

Processing station 1104, utilizing one or more processors (not shown) manages and controls the operation of system 1100. For example, processing station 1104 may prepare image data that is to be output into hardcopy form by printing section 1102. Processing station 1104 can also create, modify, store, and/or otherwise process images, which will be output by printing section 1102. In some examples, processing station 1104 can include software, firmware, or hardware to perform trapping operations that account for the errors suffered in printing section 1102 as discussed herein. Software and/or firmware may be stored, for example, in memory 1106, or other memory (now shown). Memory storing the software and/or firmware may be implemented as storage device(s) that may comprise a combination of non-transitory, volatile or nonvolatile memory such as random access memory (RAM) or read only memory (ROM). Such storage devices may be embodied using any currently known media such as magnetic or optical storage media including removable media such as floppy disks, compact discs, etc. One or more storage devices has stored thereon instructions that may be executed by the one or more processors, such that the processor(s) implement the functionality described herein. In addition, or alternatively, some or all of the software-implemented functionality of the processor(s) may be implemented using firmware and/or hardware devices such as application specific integrated circuits (ASICs), programmable logic arrays, state machines, etc.

For example, processing station 1104 can be configured to determine whether a selected pixel includes multiple colors, determine the boundaries between color separations, and determine the colors present in the selected picture element. Processing station 1104 may then determine whether a trapping operation should be performed to compensate for errors by printing section 1102, and determine which trapping color should be used for the trapping operation.

In addition, processing station 1104 can receive information about the position of a digital raster image and analyze its hardcopy produced by printing section 1102 to determine the color registration error or halo effect error (if any) of printing section 1102. Processing station 1104 can be implemented using well known components and may be configured using any combination of software, firmware, and hardware.

Although FIG. 11 shows processing station 1104 directly connected to the other components of system 1100, processing station 1104 may be indirectly coupled to the components of system 1100. For example, processing station 1104 can include a communications device to facilitate information transfer to and from the components of system 1100 and another computer or system. Processing station 1104 may communicate with a remote diagnostic computer (not shown) to make an automatic service call in response to a detected problem.

Memory 1106 serves as a storage area for system 1100. For example, memory 1106 can store one or more images having test patterns or test features that are printed by printing section 1102 into hardcopy form. Memory 1106 also provides storage for loading specific programs, such as diagnostic programs, and storage for data, such as machine history data, fault data, machine physical data, and specific machine identity information. In addition, memory 1106 can store image quality analysis software that is executed by processing station 1104 to analyze the printing accuracy of system 1100.

Memory 1106 can also store sets of tables that support trapping operations by system 1100. These tables (not shown) can include stored color pairs corresponding to the colors that define the edge and a flag to indicate whether these pairs require trapping. For example, if a table entry has colors that need trapping, it can be marked as an entry in the table or through an auxiliary data structure, and one or more intermediate trapping color or colors can be indicated by these tables. In addition, the shape of the pixels along the edge that require a trapping color can be calculated or determined by using a table look-up from memory 1106. Memory 1106 may further store trap width information, for example, sets of trap widths, used for processing as more fully discussed below.

Raster input section (RIS) 1108 forms a digital raster image from a hardcopy sample or document and feeds the digital raster image to printing section 1102. In some examples, RIS 1108 captures an image, converts it to a series of raster scan lines, and measures a set of primary color densities, i.e., red, green, and blue densities, at each point of a document. Accordingly, in some examples, RIS 1108 can obtain data from a hardcopy test image that indicates the printing accuracy of system 1100 and printing section 1102.

RIS 1108 can be implemented using known components, such as document illumination lamps, optics, a mechanical scanning drive, and a charge coupled device (CCD) array or full width scanning array, etc. For example, RIS 1108 can be implemented as a flat bed scanner. RIS 1108 may be coupled directly to the other components of system 1100, such as printing section 1102, for example, via a bus, or may be indirectly coupled to the other components of system 1100, for example, via a network.

User interface 1110 uses operating software stored in memory 1106 to operate the various machine components in an integrated fashion to produce copies and prints. For example, user interface 1110 can be coupled to processing station 1104. In some examples, user interface 1110 enables an operator to control and monitor various operator adjustable functions and maintenance activities of system 1100. User interface 1110 may further provide the user with a user Interface to input information including trap width information in fast scan and/or slow scan directions for generating and/or applying trap width parameters as discussed herein. For example, user interface 1110 can be a touch screen, or any other suitable control panel that permits control of the operation of printing section 1102. User interface 1110 can be any type of suitable visual display, such as a cathode ray tube (CRT), flat screen, etc.

It may be appreciated that FIG. 11 illustrates an example of system 1100 as a digital copier machine. Other components of such a machine are well known to those skilled in the art, and thus, for the purpose of brevity, further detailed description thereof is unnecessary for these known components.

It should also be understood that a loosely coupled printing or reproducing system is also applicable for use with the examples described herein, such as a printer or facsimile device. Moreover, examples of the disclosure are also applicable to a printer used in conjunction with a stand-alone scanner, such as a flatbed type scanner.

The foregoing descriptions have been presented for purposes of illustration and description. They are not exhaustive and do not limit the disclosed examples to the precise form disclosed. Modifications and variations are possible in light of the above teachings or may be acquired from practicing the disclosed examples. For example, the described implementation includes software, but the disclosed examples may be implemented as a combination of hardware and software or in firmware. Examples of hardware include computing or processing systems, including personal computers, servers, laptops, mainframes, micro-processors, and the like. Additionally, although disclosed aspects are described as being stored in a memory on a computer, one skilled in the art will appreciate that these aspects can also be stored on other types of computer-readable storage media, such as secondary storage devices, like hard disks, floppy disks, a CD-ROM, USB media, DVD, or other forms of RAM or ROM.

Other examples will be apparent to those skilled in the art from consideration of the specification and practice of the examples disclosed herein. The recitations in the claims are to be interpreted broadly based on the language employed in the claims and not limited to examples described in the present specification or during the prosecution of the application, which examples are to be construed non-exclusive. It is intended, therefore, that the specification and examples be considered as example(s) only, with a true scope and spirit being indicated by the following claims and their full scope equivalents.

While the teachings have been described with reference to the examples thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the terms "one or more of" and "at least one of" with respect to a listing of items such as, for example, A and B, means A alone, B alone, or A and B. Those skilled in the art will recognize that these and other variations are possible within the spirit and scope as defined in the following claims and their equivalents.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A computer-implemented method for trapping an object against a gradient background, the method comprising:
   obtaining a trapping parameter for the object in both a fast scan and slow scan direction;
   forming a first, a second, and a third color trap for the object, wherein the first color trap comprises both a trap parameter on both an inner side and an outer side of the object for different portions of the object, the second color trap comprises a trap parameter on an inner side of the object, and the third color trap comprises a trap parameter on an outer side of the object;
   comparing the first color trap for the object with the second color trap for the object;
   comparing the first color trap for the object with the third color trap for the object;
   determining that a result of the comparing the first color trap for the object with the second color trap for the object yields a larger result than a result of the comparing the first color trap for the object with the third color trap for the object; and applying trapping to the inner side of the object.

2. The method according to claim 1, further comprising:
   determining that a result of the comparing the first color trap for the object with the second color trap for the object yields a smaller result than a result of the comparing the first color trap for the object with the third color trap for the object; and
   applying trapping to the outer side of the object.

3. The method according to claim 1, wherein the comparing the first color trap for the object with the second color trap for the object and the comparing the first color trap for the object with the third color trap for the object is performed using an exclusive or operation.

4. The method according to claim 1, further comprising determining a color used for the trapping based on the comparing the first color trap for the object with the second color trap for the object or the comparing the first color trap for the object with the third color trap for the object is performed using an exclusive or operation.

5. The method according to claim 4, further comprising applying a Forced Constant Color Trapping ("FCCT") based on based on the comparing the first color trap for the object with the second color trap for the object or the comparing the first color trap for the object with the third color trap for the object is performed using an exclusive or operation.

6. The method according to claim 4, further comprising applying a Forced Average Color Trapping ("FACT") based on based on the comparing the first color trap for the object with the second color trap for the object or the comparing the first color trap for the object with the third color trap for the object is performed using an exclusive or operation.

7. A device comprising:
   a memory containing instructions; and
   at least one processor, operably connected to the memory, the executes the instructions to perform a method for trapping an object against a gradient background, the method comprising:
   obtaining a trapping parameter for the object in both a fast scan and slow scan direction;
   forming a first, a second, and a third color trap for the object, wherein the first color trap comprises both a trap parameter on both an inner side and an outer side of the object for different portions of the object, the second color trap comprises a trap parameter on an inner side of the object, and the third color trap comprises a trap parameter on an outer side of the object;

comparing the first color trap for the object with the second color trap for the object;

comparing the first color trap for the object with the third color trap for the object;

determining that a result of the comparing the first color trap for the object with the second color trap for the object yields a larger result than a result of the comparing the first color trap for the object with the third color trap for the object; and applying trapping to the inner side of the object.

8. The device according to claim 7, wherein the method is further operable to perform the method further comprising:

determining that a result of the comparing the first color trap for the object with the second color trap for the object yields a smaller result than a result of the comparing the first color trap for the object with the third color trap for the object; and applying trapping to the outer side of the object.

9. The device according to claim 7, wherein the comparing the first color trap for the object with the second color trap for the object and the comparing the first color trap for the object with the third color trap for the object is performed using an exclusive or operation.

10. The device according to claim 7, wherein the method is further operable to perform the method further comprising determining a color used for the trapping based on the comparing the first color trap for the object with the second color trap for the object or the comparing the first color trap for the object with the third color trap for the object is performed using an exclusive or operation.

11. The device according to claim 10, wherein the method is further operable to perform the method further comprising applying a Forced Constant Color Trapping ("FCCT") based on based on the comparing the first color trap for the object with the second color trap for the object or the comparing the first color trap for the object with the third color trap for the object is performed using an exclusive or operation.

12. The device according to claim 10, wherein the method is further operable to perform the method further comprising applying a Forced Average Color Trapping ("FACT") based on based on the comparing the first color trap for the object with the second color trap for the object or the comparing the first color trap for the object with the third color trap for the object is performed using an exclusive or operation.

13. A non-transitory computer readable storage medium comprising instructions for causing one or more processors to perform a method, the method for trapping an object against a gradient background comprising:

obtaining a trapping parameter for the object in both a fast scan and slow scan direction;

forming a first, a second, and a third color trap for the object, wherein the first color trap comprises both a trap parameter on both an inner side and an outer side of the object for different portions of the object, the second color trap comprises a trap parameter on an inner side of the object, and the third color trap comprises a trap parameter on an outer side of the object;

comparing the first color trap for the object with the second color trap for the object;

comparing the first color trap for the object with the third color trap for the object;

determining that a result of the comparing the first color trap for the object with the second color trap for the object yields a larger result than a result of the comparing the first color trap for the object with the third color trap for the object; and applying trapping to the inner side of the object.

14. The non-transitory computer readable storage medium according to claim 13, further comprising: determining that a result of the comparing the first color trap for the object with the second color trap for the object yields a smaller result than a result of the comparing the first color trap for the object with the third color trap for the object; and applying trapping to the outer side of the object.

15. The non-transitory computer readable storage medium according to claim 13, wherein the comparing the first color trap for the object with the second color trap for the object and the comparing the first color trap for the object with the third color trap for the object is performed using an exclusive or operation.

16. The non-transitory computer readable storage medium according to claim 13, further comprising determining a color used for the trapping based on the comparing the first color trap for the object with the second color trap for the object or the comparing the first color trap for the object with the third color trap for the object is performed using an exclusive or operation.

17. The non-transitory computer readable storage medium according to claim 16, further comprising applying a Forced Constant Color Trapping ("FCCT") based on based on the comparing the first color trap for the object with the second color trap for the object or the comparing the first color trap for the object with the third color trap for the object is performed using an exclusive or operation.

18. The non-transitory computer readable storage medium according to claim 16, further comprising applying a Forced Average Color Trapping ("FACT") based on based on the comparing the first color trap for the object with the second color trap for the object or the comparing the first color trap for the object with the third color trap for the object is performed using an exclusive or operation.

* * * * *